July 25, 1939. M. FELD 2,167,448
LIQUID DISPENSING CONTAINER
Filed May 3, 1937 5 Sheets-Sheet 1
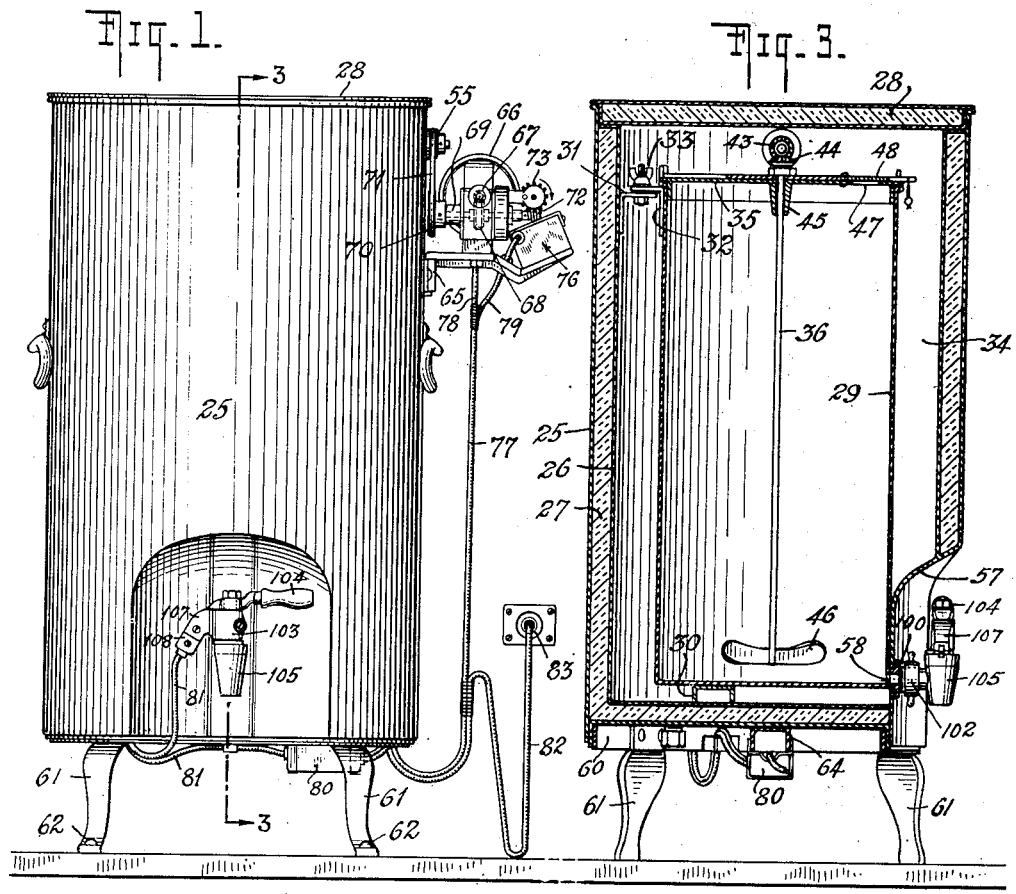
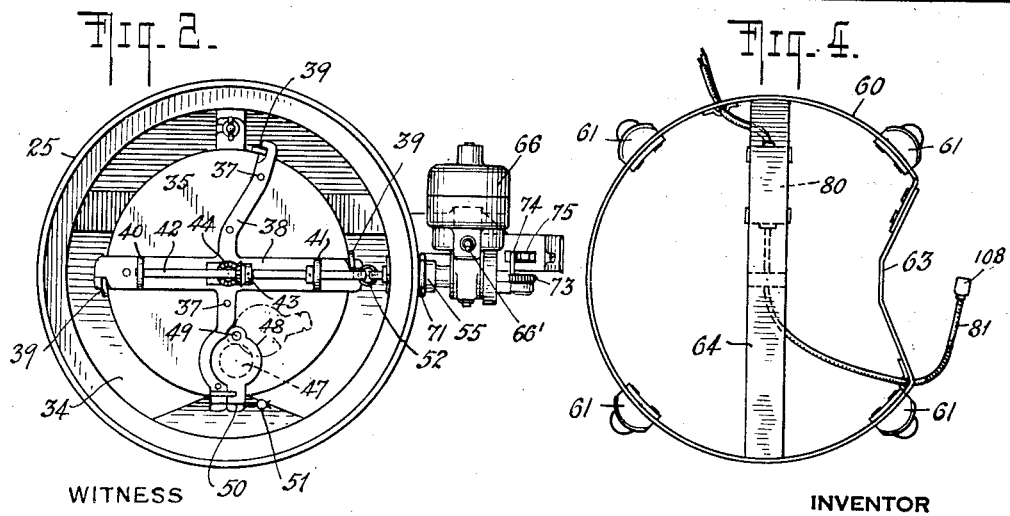
WITNESS
G. V. Rasmussen
INVENTOR
MAYER FELD
BY
ATTORNEYS July 25, 1939.  M. FELD  2,167,448
LIQUID DISPENSING CONTAINER
Filed May 3, 1937  5 Sheets-Sheet 2
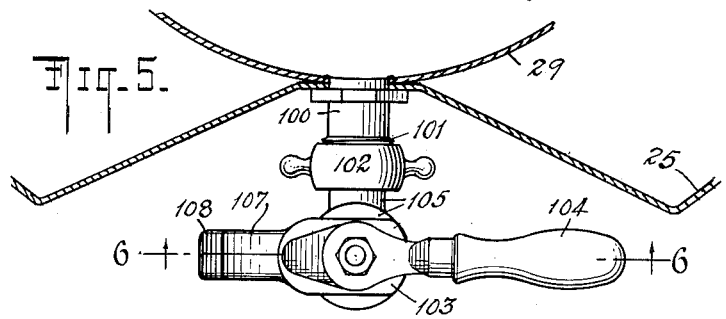
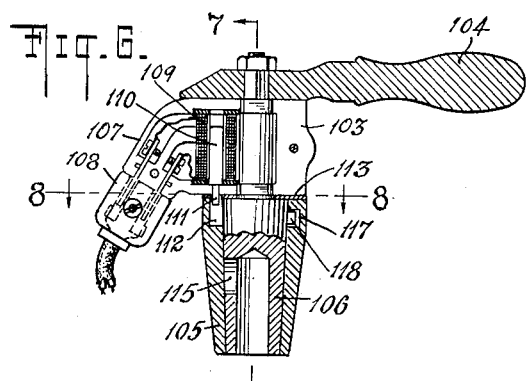
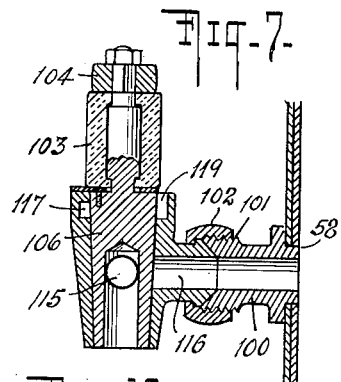
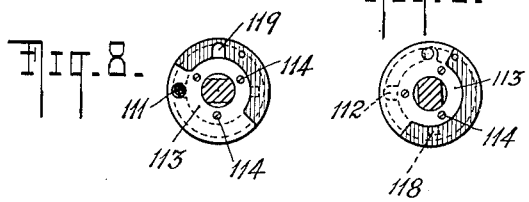
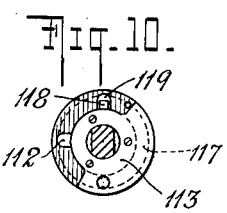
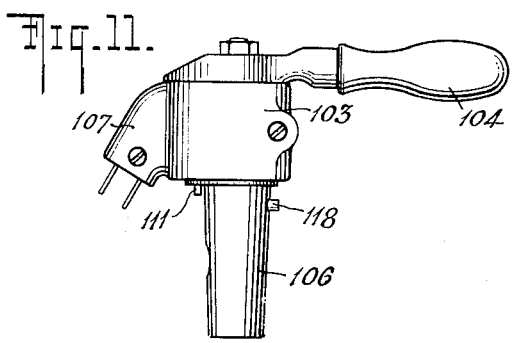
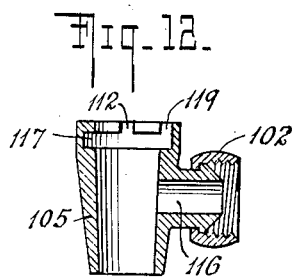
WITNESS
G. V. Rasmussen
INVENTOR
MAYER FELD
BY
ATTORNEYS July 25, 1939.  M. FELD  2,167,448
LIQUID DISPENSING CONTAINER
Filed May 3, 1937  5 Sheets-Sheet 3
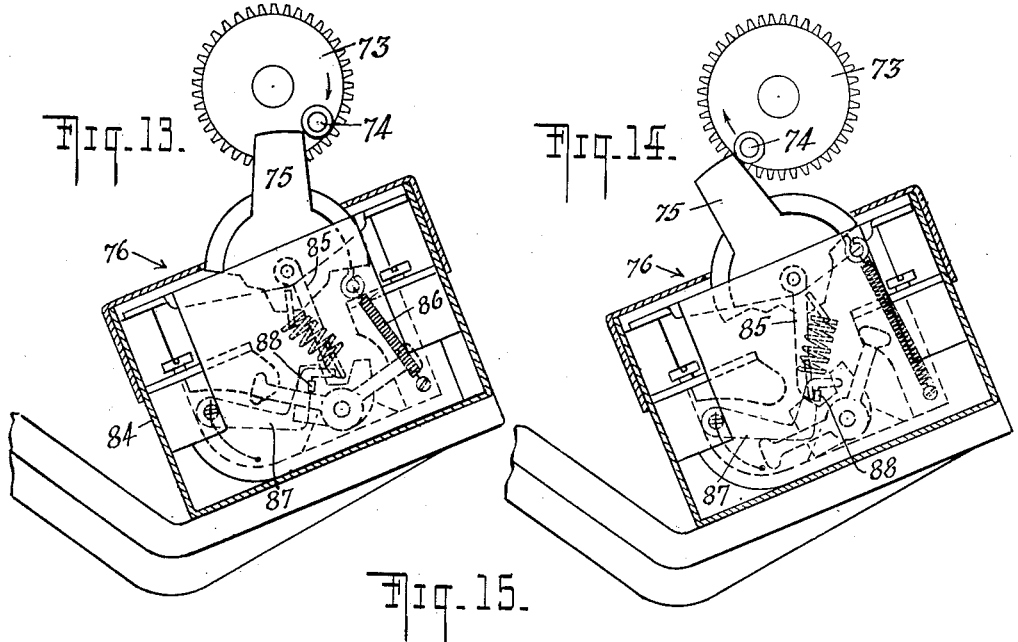
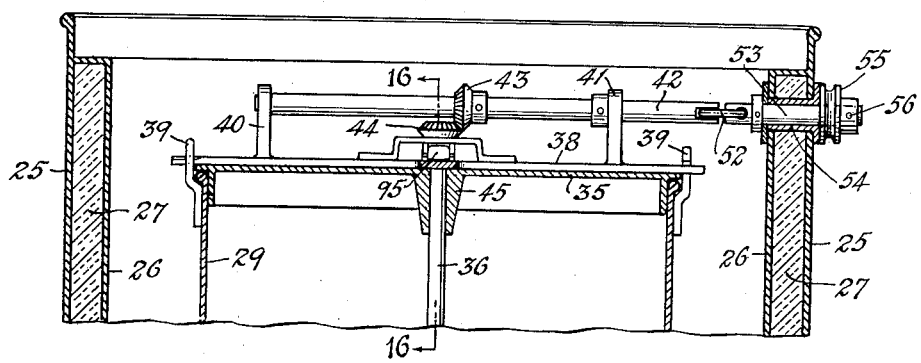
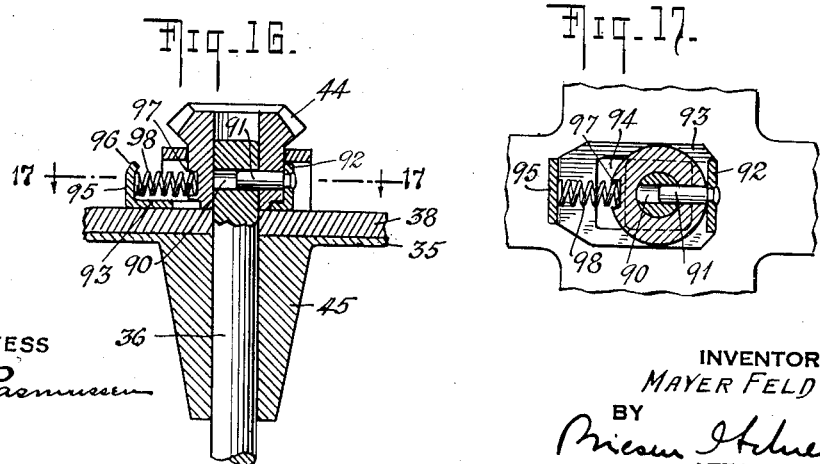
WITNESS
INVENTOR
MAYER FELD
BY
ATTORNEYS July 25, 1939.  M. FELD  2,167,448
LIQUID DISPENSING CONTAINER
Filed May 3, 1937   5 Sheets-Sheet 4
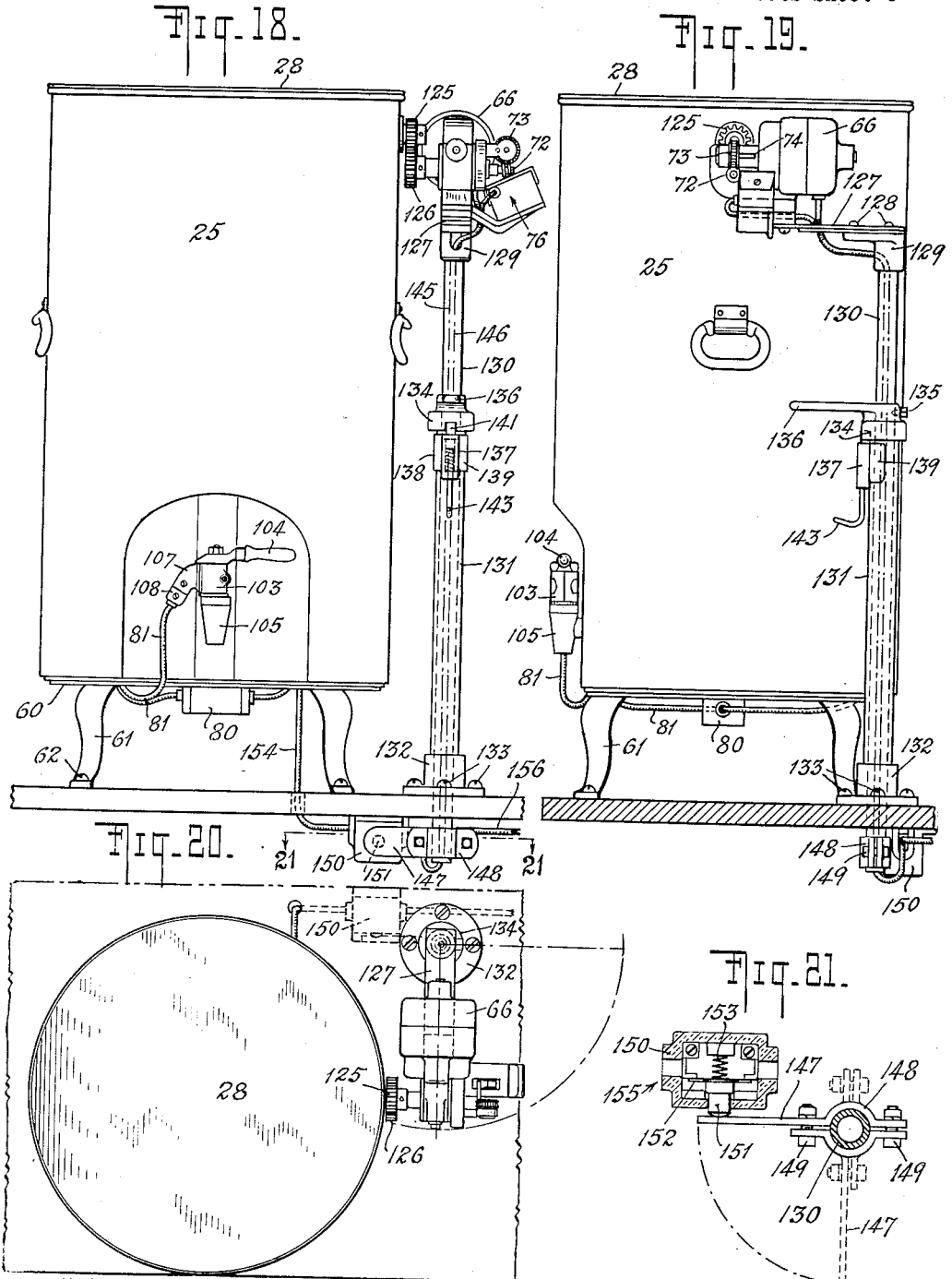
WITNESS
G. V. Rasmussen
INVENTOR
MAYER FELD
BY
ATTORNEYS

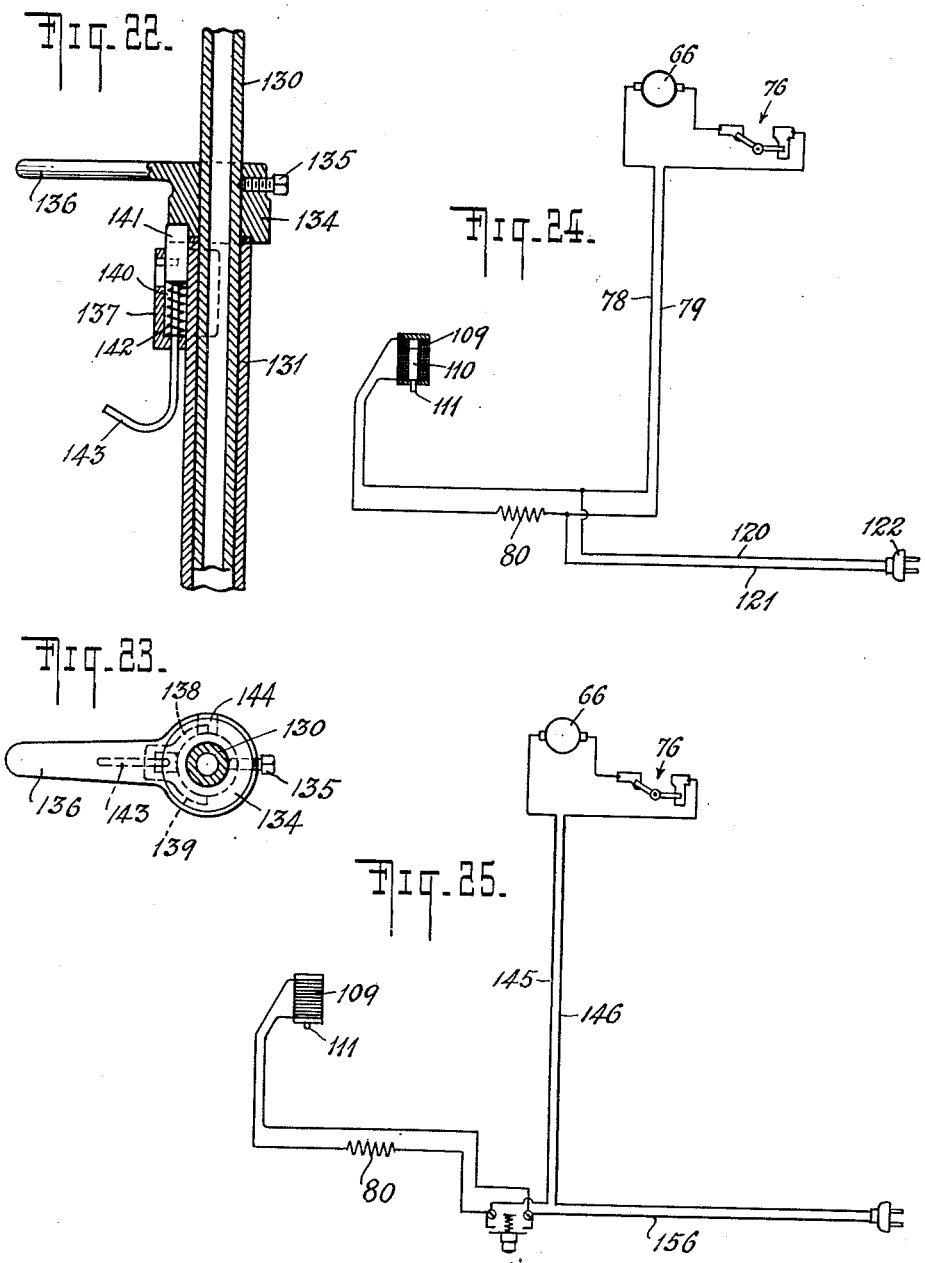

Patented July 25, 1939

2,167,448

UNITED STATES PATENT OFFICE 2,167,448

LIQUID DISPENSING CONTAINER

Mayer Feld, Valley Stream, N. Y.

Application May 3, 1937, Serial No. 140,302

14 Claims. (Cl. 221—67)

The invention relates to a liquid dispensing container and more particularly to a device of such character especially adapted for the shipment and temporary storage in the retail establishment, of a fluid commodity such as milk to be dispensed and sold in bulk; a type of distribution resorted to in merchandising "loose milk" as distinguished from the merchandising of such commodity in sealed individual bottles or containers.

An object of the invention is to provide a dispensing container for such liquid commodity, which is adapted to be filled with the liquid, such as milk, at the source of distribution, for instance the dairy, supplied with a quantity of refrigerant, such as ice, in a compartment of the container unit surrounding the body of liquid, and sealed, prior to its delivery to the retail store, where such dispensing container is adapted to be positioned upon a specially constructed stand and operatively connected to certain mechanical devices designed to insure the dispensing of the commodity unadulterated, uncontaminated, and in a manner insuring the dispensing of the proper proportion of milk and cream with each individual quantity of fluid removed from the container.

A more particular object of the invention is to provide such a container with a dispensing faucet or spigot adapted to have its operative elements electrically controlled so that no unauthorized discharge of any portion of the contents of the container may be made during transit of the container from the source of wholesale distribution to the retail shop. In other words, the dispensing container of the present invention is provided with a tamper-proof discharge valve.

A further object of the invention is to provide mechanism for effecting a thorough automatic periodical admixture of the milk and cream in the container, whereby each customer purchasing a quantity of the milk from the container is assured of receiving a proper proportion of cream with the milk, no matter what the quantity of such fluid remaining in the container. This admixture of the component parts of the contained fluid is accomplished in accordance with my invention by an electrically controlled automatic intermittently operated mechanism of novel construction and operation.

A further object of the invention is to provide a device of simple construction and design which is adapted for ready and facile disassembling for purposes of cleaning and sterilization at the dairy and requiring no tools for either taking apart or reassembling its component parts.

A more particular object of the invention is to provide a container which facilitates the operation of dispensing any quantity of the fluid contained therein by the retail shop owner, but which precludes the possibility of introduction into such dispensing container of any adulterating or diluting material without breaking the seal with which the container has been provided at the dairy.

A still further object of the invention is to provide a dispensing container which is hermetically sealed so as to preclude the admission thereinto of dust, bacteria, and particles of dirt, or exposure of any portion of the apparatus, in contact with the milk, to the atmosphere or any contaminating influence.

A still further object of the invention is to provide a simple support and appurtenant mechanism for effecting some of the above objects in the retail establishment so that a minimum of time and effort is necessarily expended in setting up the dispensing container delivered to the retail shop and making it ready for dispensing the fluid contents thereof to the consumer.

Specific embodiments of my invention are illustrated in the accompanying drawings, in which Fig. 1 is a front elevation of a dispensing container constructed in accordance with my invention and positioned upon a stand in the retail establishment; Fig. 2 is a top plan view of the container with the ice compartment cover removed; Fig. 3 is a vertical section on the line 3—3 of Fig. 1; Fig. 4 is a plan view of the base or stand upon which the container is adapted to be positioned in the retail establishment; Fig. 5 is an enlarged detailed sectional view of a portion of the container wall and the dispensing faucet or spigot mounted thereon; Fig. 6 is a section on the line 6—6 of Fig. 5; Fig. 7 is a section on the line 7—7 of Fig. 6; Figs. 8, 9, and 10 are sections on the line 8—8 of Fig. 6 showing the valve seat portion of the spigot in progressively different positions during rotation thereof; Fig. 11 is an outside view of the valve plug and spigot body; Fig. 12 is a vertical section through the valve seat body; Figs. 13 and 14 are partial sectional views showing the switch mechanism in detail in its two positions—"on" and "off"—respectively; Fig. 15 is an enlarged detail cross-sectional view of the upper portion of the container showing the driving mechanism for the fluid stirring device; Fig. 16 is a section along the line 16—16 of Fig. 15 showing the details of the mechanism for removing the stirrer; Fig. 17 is a section on the line 17—17 of Fig. 16; Figs. 18 and 19 are front and side elevations, respectively, of a dispensing container constructed in accordance with my invention and connected to the periodically operated stirring mechanism by a support of modified construction; Fig. 20 is a plan view of such modified stirring mechanism supporting device; Fig. 21 is an enlarged detail of the lower end of the support for the motor time-switch mechanism and of the switch controlled by the position of such support; Fig. 22 is a vertical section through the support; Fig. 23 is a plan view thereof; Fig. 24 is a schematic showing of the electric circuit for the first embodiment of my inventive structure; and Fig. 25 is a schematic showing of the electric circuit for the modified structure.

In the drawings, in which similar reference characters identify similar parts in the several views, 25 is the main container unit outer wall, and 26 is the inner wall forming between them a space 27 filled preferably with an insulating material, such as cork. The main container unit is provided with an insulated cover 28.

The liquid container consists of a vessel 29 formed of sheet metal material, preferably stainless steel, or other material not corrodible by, or otherwise affecting, the milk. Such inner liquid vessel is supported within the main container unit upon a channel bar 30 of rectangular cross-section and from the side of the inner compartment by brackets 31, 32 secured together by bolt and nut structure 33. The milk containing vessel 29 is thus surrounded by a space 34 adapted to constitute an ice or other refrigerant compartment.

The liquid containing vessel 29 is provided with a cover 35 which supports the agitator shaft 36 and the mechanism for operating the agitator.

As clearly shown in Figs. 2 and 3, the cover 35 has secured thereto by rivets 37 a spider structure 38 having two crossed arms, the extremities of which are bevelled (see Fig. 15) so as to engage hooked projections 39 of the wall of the vessel 29. Such construction permits the cover 35 to be rotated about its center so that the ends of the spider structure 38 may be engaged by or disengaged from the hooked projections 39.

One of the transverse arms of the spider structure 38 is provided with bearings 40 and 41 in which is supported the shaft 42 to which is secured bevel gear 43 meshing with bevel gear 44 mounted within a bridge straddling the upper end of the agitator shaft 36. Such shaft is secured within the body of the gear 44 and extends through the cover 35 and through the hub 45 depending from the cover. At the lower extremity of the agitator shaft 36 is a propeller blade or stirrer 46.

The means for filling the liquid vessel 29 comprises an inlet 47 having a cover 48 pivoted at 49, the cover being shown in dotted lines in Fig. 2 in its position to permit access through the inlet opening 47 into the liquid vessel. When the vessel has been filled with milk at the dairy, the cover 48 is moved about its pivot 49 from its dotted line position shown in Fig. 2 to its full line position, and a sealing wire 50 is passed through an opening therein and an opening at the contiguous point in the arm of the spider structure 38, the sealing wire being twisted in the well-known manner and supplied with lead seal 51. The liquid vessel having thus been filled with milk, it is hermetically sealed both against contamination by dust, dirt or bacteria and against tampering, either during transit or while in the premises of the retail shop.

One end of the shaft 42 is provided with a ring 52 passed through a slot in the shaft, the ring also passing through a hole in the adjacent end of a stub shaft 53 (see Fig. 15), which shaft is supported in a bearing 54 passing through the outer container walls 25 and 26. Upon the end of the stub shaft 53 extending outside of the container unit is mounted a grooved pulley 55 secured in position upon the shaft by collar 56.

As clearly shown in Fig. 3, the wall 25 of the main container unit is flanged inwardly adjacent the bottom of one side thereof to contact with the wall of the liquid vessel 29 to provide a recess 57 which is preferably of circular form in transverse section. The walls of the liquid vessel and the main container unit are in contact at the base of this recess and an outlet aperture 58 is drilled through the juxtaposed walls to which outlet aperture is applied the pipe connection of the dispensing spigot hereinafter to be described.

The entire container unit just described is adapted to be positioned in the retail establishment in which the contents of the container are to be dispensed, upon a base or frame structure 60, including legs 61 which may conveniently be secured to a supporting surface as a table or counter by bolts or screws 62. The base or frame structure is illustrated in Fig. 4 and comprises a sheet metal ring of substantially circular configuration but bent inwardly as at 63 to conform with the bottom peripheral contour of the container unit. The base 60 is provided with a transverse channel iron 64 upon which and the ring 60 the container unit is adapted to be supported. The transverse channel iron 64 also houses the electrical wire connections hereinafter to be described.

Coming now to a description of the mechanism adapted to produce the predetermined periodic operation, for periodic predetermined intervals of time, of the stirring or agitating device, in the first embodiment of my invention illustrated, the outer container wall 25 has secured thereto at an appropriate point below the pulley 55 a bracket 65 having a shelf supporting electric motor 66. Upon the end of the motor shaft is secured a gear 67 meshing with a worm gear 68 centrally positioned upon a shaft 69, upon one end of which is secured a grooved pulley 70, belt 71 connecting such pulley with pulley 55. Upon the opposite end of the shaft 69 is mounted a worm 72 meshing with worm gear 73. The worm gear 73 has extending therefrom a long pin 74 adapted to contact and operate, during the rotation of the worm gear 73 in the direction of the arrows in Figs. 13 and 14, the switch lever 75 of the mark-time switch shown in detail in such figures. The details of the operation of such mark-time switch will be described hereinafter.

The source of current to the motor, adapted to be controlled by mark-time switch 76 and in which circuit is included such mark-time switch, comprises a cable 77 having its branches 78 and 79 leading to the motor and to the mark-time switch, respectively. The cable 77 leads, through resistance 80, to cable 81, which, in turn, leads to the discharge spigot and from there the electrical circuit is through the cable 82 to the outlet 83. The motor may be conveniently provided with an independent switch 66'.

The mark-time switch 76, illustrated in Figs. 13 and 14, is a standard type of time switch having a main spring (not shown) and a main spring gear (also not shown) inside of the casing 84. The switch lever 75 is controlled by a switch lever arm 85, the spring 86 being effective to return the switch lever to its original position when it has been displaced therefrom by contact with the pin 74 projecting from the worm gear 73 in the course of the revolution of the latter in the direction of the arrows indicated in Figs. 13 and 14. The normal or closed position of the parts of the time switch is shown in Fig. 13 while its abnormal or open position is shown in Fig. 14. The time switch mechanism includes a spring pressed holding pawl 87 having near the hooked end thereof a lug 88. After the switch lever arm 85 is moved from its "on" position illustrated in Fig. 13 to its "off" position illustrated in Fig. 14, it is held in such "off" position by the lug 88 on pawl 87, starting the clock mechanism. When the cam lug on the main spring gear (not shown) rides over the end of the holding pawl 87 and trips the same, the switch lever arm 85 returns to its normal position, thereby throwing on the switch. The motor now starts until the switch is reset by engagement of the pin 74 against the switch lever 75.

Turning now to the details of the mechanism for permitting removal of the stirrer from within the fluid container, such mechanism is illustrated in Figs. 16 and 17. Referring particularly to such figures, the agitator shaft 36 is provided near its upper end and extending into the hub of the bevel gear 44 with a transverse aperture 90, into which extends a pin 91 secured at its outer end to a vertically extending flange 92 of a plate member 93. The plate member 93 is provided with a central elongated slot 94 and at its end opposite that from which extends the flange 92 is provided with a vertically extending flange 95, the upper portion of which is bent slightly inwardly as at 96, so as to retain between such vertical flange 95 and a recess 97 within the hub of the bevel gear 44, the spring 98. When it is desired to remove the agitator shaft 36, pressure is applied to the vertical flange 95, compressing the spring 96 so as to move the plate member 93 in a horizontal direction, thereby removing the pin 91 from within the aperture 90. The agitator shaft 36 may then be moved downwardly through the hub 45 and removed for purposes of cleaning or sterilization.

Coming now to a description of the discharge or dispensing spigot, such spigot and its parts are illustrated in Figs. 5-12 inclusive to which figures reference will now be had. A ground joint bushing 100 is soldered into the aperture 58 and is threaded at one end 101 to receive a coupling 102 into which is secured the valve body or seat 105. The discharge spigot comprises the valve head 103, the handle 104, the valve seat 105, and the valve plug 106.

The valve head 103 is provided with a projection 107 constituting one portion of an electrical connection adapted to cooperate with an electrical plug 108. Housed within the valve head is an electromagnet 109 having the usual coils and an armature 110 from which depends at the bottom thereof, a pin 111. The pin 111 during all times when the electromagnet 109 is not energized, i. e., when the electric connection between the electric plugs 107 and 108 has not been established, extends into an aperture 112 in the valve seat body 105, extending into such aperture through the plate 113 positioned upon the upper surface of the valve plug 106. The plate 113 is of the configuration shown in Figs. 8, 9, and 10, being secured to the valve plug by screws 114.

In the locked position of the spigot, as shown in Fig. 6, the pin 111 extends into the aperture 112, the plate 113 being in the position shown in Fig. 8. When the electromagnet 109 is energized by being connected to a source of current as hereinafter to be described, the pin 111 moves upwardly with the armature 110, out of the aperture 112, permitting rotation of the valve handle 104. As such valve handle is rotated to the open position of the valve or spigot, the plate 113 is rotated to its position shown in Fig. 9, in which position the valve plug 106 has its aperture 115 opposite the outlet passage 116 of the valve head 103 so that communication is established for the flow of liquid from the container 29 through the discharge spigot.

If the valve handle 104 is rotated to a degree greater than its position at right angles to that illustrated in Fig. 5, the plate 113 is further rotated to its position shown in Fig. 10. The valve sea 105 is provided with a circumferential groove 117 near the top extremity thereof in which rides a pin 118 extending from the valve plug 106. The circumferential groove 117 has two radially extending recesses 112 and 119, into the latter of which the pin 118 is adapted to enter when the valve head and plug structure is to be removed for cleaning and sterilization.

Turning now to the electrical circuit shown in Fig. 24, which illustrates the circuit in the closed condition of the time switch, wires 78 and 79 are connected respectively to one terminal of the motor 68 and to one terminal of the time switch. The wire 79 leads from the terminal of the time switch through the resistance 80, interposed into such line, in order to reduce the voltage, to one terminal of the electro-magnet 109, the wire 78 leading from one terminal of the motor to the other terminal of said electromagnet. The source of current is supplied by wires 120 and 121 connected respectively to the wires 78 and 79, to the latter in advance of the resistance 80 and at their opposite ends to an electric plug 122 for connection to the main source of current, as the outlet 83.

The steps in the utilization of the novel liquid dispensing container and the operation thereof in filling, sealing, setting up the same, and its function in dispensing its liquid contents are as follows:

The container unit is filled at the dairy or other main source of supply of the liquid to be contained therein and dispensed therefrom, through the inlet 47 which is thereafter closed and sealed in the manner indicated. Ice or other refrigerant is placed in the compartment 34 and the cover 28 put in place upon the unit. The unit is then transported to the retail establishment and is set up therein by placing the same upon the base provided therefor and the cable 82 plugged into the outlet 83. This will supply current through the cable 82 to the motor, the switch 76 of which has been brought to "on" position and the marktime switch set for causing operation of the motor at regular intervals of time, for instance, 2½ to 3 minutes. The speed of the motor and the setting of the time switch are such that the motor will operate for a period of approximately five seconds, turning the agitator approximately 18 times during such period. As soon as the cable 82 has been connected to the source of electricity, and the electric plugs 107 and 108 connected, current will flow therethrough, through the wires 78 and 79, through the resistance 80 to the electromagnet 109, energizing the same so that its armature 110 is drawn upwardly into the electromagnet, withdrawing the pin 111 at the lower extremity thereof from the aperture 112 in the valve head 105. This energization of the electromagnet is, of course, attained only after the plug 108 has been inserted into the projection 107 so as to establish electrical connection between such electromagnet and the source of current. After energization of the electromagnet in this manner the valve handle 104 may be turned for removing any portion of the contents of the liquid container. It is to be noted that no portion of the contents of the container may be removed, for instance, in transit of the unit from the dairy to the retail establishment by the driver or any other unauthorized person, as the discharge spigot is securely locked by the pin 111 and is capable of being turned on only upon the establishment of electrical connection between the valve head 103 and the current supplied to the electric motor. In this manner, also, the ultimate consumer is assured that he has not been sold any portion of the milk from the container before such milk has been thoroughly agitated so as to insure a proper mixing of the cream with the milk.

When the plug has been placed into the socket 83, the mark-time switch 76 immediately starts functioning and causes the motor to operate, effecting the rotation of the stirring mechanism. As the motor revolves, the worm gear 73 rotates in the direction of the arrow in Fig. 13, causing the pin 74 extending therefrom, to engage, at each revolution of such worm gear, the switch lever 75 of the mark-time switch, causing it to be moved to its "off" position (Fig. 14). After the interval of time for which the mark-time switch has been set, the switch lever 75 returns to its "on" position in Fig. 13 and is thereafter again moved to its "on" position by being contacted by the pin 74 as the worm gear 73 has made another complete revolution.

In the modified embodiment of my inventive structure illustrated in Figs. 18–23 inclusive, the main container unit, dispensing spigot structure, and stirrer driving mechanism are substantially as those heretofore described with the exception that the driving of the stirrer mechanism, instead of being effected by means of two pulleys and a belt, is accomplished by means of two meshing worm gears. The mechanism for supporting the driving structure is mounted directly upon the table, counter or other supporting surface for the container unit and is so constructed that the motor and switch units can be pivoted from their positions for facilitating the removal of the container unit from the supporting surface.

Referring particularly to Figs. 18–23, upon the end of the stub shaft driving the stirring mechanism is mounted a worm gear 125 with which a worm gear 126 is adapted to be brought into engagement. The motor 66 and the time switch controlling the same are supported upon a duplex leaf spring 127 which is secured by rivets 128 to a bracket 129 mounted upon the upper end of a tubular pipe 130. The latter is rotatably mounted within a tubular pipe 131 fixedly supported in a flanged hub 132 and secured by bolts or screws 133 to the table or counter surface.

Seated upon the upper extremity of pipe 131 is a bearing hub 134 (Fig. 22) carrying set screw 135 pressing against the surface of the pipe 130. The hub 134 at its opposite side is provided with handle 136. Straddling the lower pipe 131 near its upper extremity is a strap 137 having flanges 138, 139 (Fig. 23). The hub 134 and the strap 137 are recessed at 140 so as to accommodate a spring pressed latch 141 which is urged upwardly by spring 142. Depending from the lower extremity of the latch 141 is a hook-shaped handle 143.

On the rear under surface of the hub 134 there is provided a notch 144 into which the latch 141 is received when the motor and driving gear 126 is swung out of engagement with the gear 125.

The tubes 130 and 131 carry, as indicated in Figs. 18 and 19, the electric wires 145 and 146 which extend downwardly through such tubes and through the hub 132 upon the table or counter support, and through such support to a switch generally designated as 155. The inner tube 130 extends through the support for the dispensing unit and has secured to the bottom extremity thereof a lever 147 by means comprising a circular clamping bracket 148 secured together by the bolts 149.

The switch 155 is secured to the bottom of the supporting table and comprises a casing 150 housing a spring pressed switch button 151 secured to plate 152 urged outwardly through the switch aperture by spring 153. Of the two electric contacts of the switch one is connected to the wire 145 and the other to wire 154 leading through the resistance 80 to the dispensing spigot.

The above described embodiment of the motor and time switch supporting structure eliminates the necessity of removing such motor and switch with the shelf 65 from the side of the container of the first embodiment described and placing the same upon the supporting table or counter. In accordance with the second embodiment of this portion of the inventive structure, when the container is to be removed from its support, the handle 143 is pulled down so as to disengage the latch 141 from the recess in hub 134 in which it lies so that the handle 136 secured to the pipe 130 may be turned to a position 90° removed from its original position, thereby disengaging the worm gear 126 from the worm gear 125. The duplex spring 127 permits this disengaging operation without difficulty. The motor and time switch may thus be turned from proximity to the container so that the latter may be removed from its position upon the base.

In positioning a new container upon the base, the procedure is reversed, the handle 136 being turned in the opposite direction so as to have the pipe 130 revolve approximately 90° to bring the worm gear 126 into meshing engagement with the worm gear 125. This operation will bring the lever 147 secured to the pipe 130 below the container supporting surface from its dotted line position shown in Fig. 21 to its fixed line position in such figure and cause it to press the switch button 151 inwardly against the spring 153, establishing electrical contact between the contacts of the switch 146, thereby permitting flow of current from the wire 145 through the wire 154 and through resistance 80 to the electric plug of the spigot mechanism. Such plug, upon insertion into its socket in the valve head, will permit the turning of the spigot handle and the dispensing of liquid from the container. At the same time, electrical connection is established between the wire 156 to wire 146 supplying current to the time switch and to the motor and causing the operation of these instrumentalities in the manner hereinabove described, whereby the periodical turning of the agitating means is effected.

While I have described specific embodiments of my invention, it will be obvious that many changes in the particular arrangement and configuration of the various parts may be made without departing from my invention.

I claim:

1. A liquid storage and dispensing unit comprising a container for the liquid, an agitator within said liquid container, actuating mechanism operatively connected to said agitator and adapted to operate the agitator automatically for a predetermined fixed duration of time at fixed predetermined intervals, a dispensing faucet connected to said liquid container, electrical means for preventing the operation of said faucet, and means operatively connecting said actuating mechanism with said electrical means and adapted to control the operation of said actuating mechanism and said electrical means.

2. In a liquid storage and dispensing unit comprising a container for the liquid to be dispensed, a dispensing faucet including a valve seat, a valve head through which extends a valve stem having a handle affixed to its upper end and a valve plug affixed to its lower end, an electromagnet housed within said valve head and secured to said valve stem, an armature for said electromagnet arranged to extend into a recess provided in said valve seat so as to prevent rotation of said handle from its closed position when said electromagnet is deenergized, and electrical means for energizing said electromagnet to remove the armature thereof from its locking position and thereby to enable said handle to be actuated.

3. A liquid storage and dispensing unit comprising a container for the liquid, an agitator within said liquid container, electrically operated mechanism for automatically operating the agitator for a predetermined fixed duration of time at fixed predetermined intervals, means connecting said mechanism to the agitator, a dispensing faucet, an electrical circuit including said agitator-operating mechanism, a source of electric current for said circuit, and electrical means included in said circuit and operatively associated with said dispensing faucet, said means being adapted to prevent the operation of said faucet and to render said faucet effective to dispense the contents of said container only when said agitator-operating means is operatively connected to said current source.

4. A liquid storage and dispensing unit comprising a container for the liquid, an agitator within said liquid container, actuating mechanism operatively connected to said agitator and adapted to operate the agitator automatically for a predetermined fixed duration of time at fixed predetermined intervals, a dispensing faucet having a valve head, an electromagnet housed within said head and an electric connection between said electromagnet and the agitator-operating mechanism for locking the dispensing faucet at all times except when said agitator-operating mechanism is operatively connected to the unit.

5. In a liquid storage and dispensing unit, the combination of a container for the liquid to be dispensed, a liquid-stirring device within said container, an electrical stirrer-actuating mechanism operatively connected to said stirring device, a dispensing faucet connected to said container, said faucet comprising a valve head, a valve seat, a handle, an electromagnet housed within said valve head, an armature extending from said electromagnet into the valve seat so as to prevent rotation of said handle, a circuit including said stirrer-actuating mechanism and said electromagnet and means connected to said circuit for energizing said electromagnet and thereby removing the armature thereof from its valve locking position when electrical connection is established between the source of current and the stirrer-actuating mechanism.

6. A liquid storage and dispensing unit comprising a container for the liquid, a cover for said container, a hub, an agitator within said liquid container including an agitator shaft depending from said cover and extending into said hub, means for detachably connecting said agitator shaft to said hub comprising a slidable plate having two upstanding flanges at the ends thereof, a pin extending from one of said flanges inwardly into the agitator shaft and a spring anchored at one end to the other of said flanges and at the other end to said hub, whereby a sliding movement of said plate permits withdrawal of the agitator shaft from said hub, and actuating mechanism operatively connected to said hub for causing the operation of said agitator.

7. A liquid storage and dispensing unit comprising a container for the liquid, an agitator disposed within said liquid container, and actuating mechanism operatively connected to said agitator and adapted to operate the agitator automatically for a predetermined fixed duration of time at fixed predetermined intervals, said mechanism including a motor, a time-switch, a gear operatively connected to the motor shaft and an elongated pin extending from the face of said gear adapted to contact the operative lever of the time-switch.

8. A liquid storage and dispensing unit comprising a container for the liquid, a liquid stirring device within said container, an electric motor operatively connected to said stirring device, a time-switch controlling said motor, and a support for the motor and time-switch comprising a standard upon which the motor and time-switch are mounted and means for revolvably supporting said standard whereby the latter may be moved to disengage said motor from the stirring device and to carry the motor and time-switch out of proximity with the container.

9. A liquid storage and dispensing unit comprising a container for the liquid, a liquid stirring device within said container, an electric motor operatively connected to said stirring device, a time-switch controlling said motor, a support for the motor and time-switch comprising a standard upon which the motor and time-switch are mounted, and means for revolvably supporting said standard whereby the latter may be moved to disengage said motor from the stirring device and to carry the motor and time-switch out of proximity with the container, said last mentioned means including a tube-shaped member adapted to receive said standard and connected thereto by a bearing hub having a handle for pivoting said standard and means for locking said standard in position.

10. A liquid storage and dispensing unit comprising a container for the liquid, a liquid stirring device within said container, an electrc motor operatively connected to said stirring device, a time-switch controlling said motor, a support for the motor and time-switch comprising a standard upon which the motor and time-switch are mounted and means for revolvably supporting said standard whereby the latter may be moved to disengage said motor from the stirring device and to carry the motor and time-switch out of proximity with the container, said last mentioned means including a tube-shaped member adapted to receive said standard and connected thereto by a bearing hub having a handle for pivoting said standard and means for locking said standard in position, said means including a projection upon said tube-shaped member, a spring latch supported by said projection and engaging said hub and an operating handle for said spring latch.

11. A liquid storage and dispensing unit comprising a container for the liquid, a liquid stirring device within said container, an electric motor operatively connected to said stirring device, a time-switch controlling said motor, a support for the motor and time-switch comprising a standard upon which the motor and time-switch are mounted, means for revolvably supporting said standard whereby the latter may be moved to disengage said motor from the stirring device and to carry the motor and time-switch out of proximity with the container, a dispensing faucet connected to said liquid container, an electrically controlled lock for said dispensing faucet, a circuit including the electrical controlled lock for said faucet and a switch, and a lever attached to said revolvable standard and adapted to engage and close said switch to release said lock when said standard is positioned to place the motor in operative connection with said stirring device.

12. A liquid storage and dispensing unit comprising a container for the liquid, a liquid stirring device within said container, means for automatically actuating said stirring device for a predetermined fixed duration of time at fixed predetermined intervals, means for detachably connecting said actuating means to said stirring device, a movable support for said actuating means operable to disengage the stirring device from the actuating means and to carry the latter out of proximity with the container, a dispensing faucet connected to said container, means for locking said faucet in closed position and means associated with said movable support for causing said locking means to unlock said faucet when said actuating means is connected to said stirrer, thereby enabling said faucet to be operated.

13. A liquid storage and dispensing unit comprising a container for the liquid, a cover for said container, a liquid stirring device supported by said cover and disposed within said container, means exteriorly of the container for automatically actuating said stirring device for a predetermined fixed duration of time at fixed predetermined intervals, means for detachably connecting said actuating means to said stirring device, and a movable support for said actuating means operable to disengage the stirring device from the actuating means and to carry the latter out of proximity with the container and said stirring device.

14. A liquid storage and dispensing unit comprising a sealed container for the liquid, an enlarged enclosure for said container, means supporting said sealed container in spaced relation with respect to said enclosure, agitator means including an agitator shaft within said liquid container, means for automatically actuating said agitator means for a predetermined fixed duration of time at fixed predetermined intervals and mechanism operatively connecting said actuating means to said agitator shaft, said mechanism being disposed in the space between said container and said enclosure and extending through the latter.

MAYER FELD.